Nov. 13, 1962 D. O. BRANT 3,063,359
COFFEE MAKER
Filed Dec. 17, 1957
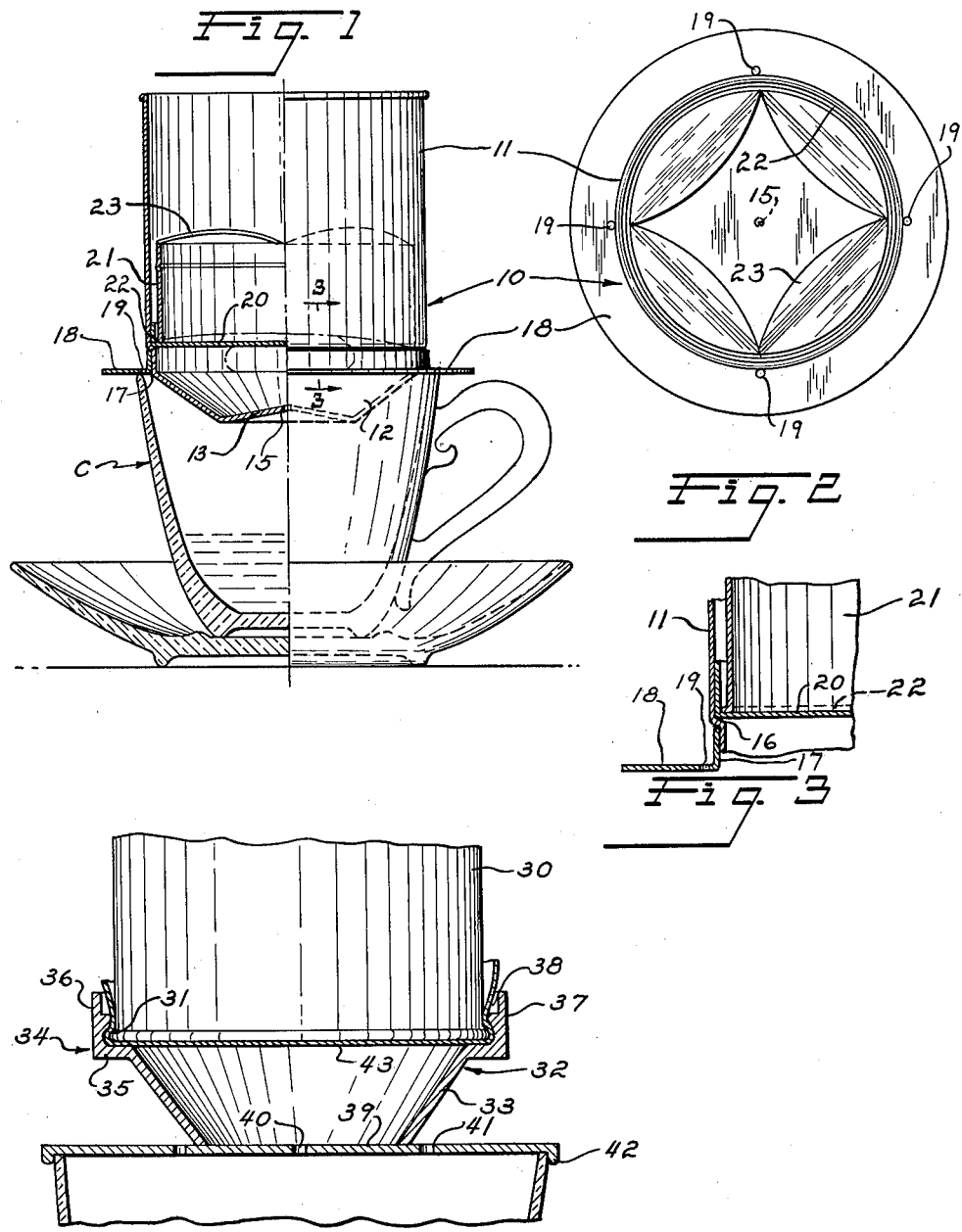
INVENTOR
DAVID O. BRANT
BY Edwin A. Blosk
ATTORNEY 3,063,359
COFFEE MAKER
David O. Brant, 1017 Chevy Chase Drive,
Beverly Hills, Calif.
Filed Dec. 17, 1957, Ser. No. 703,447
1 Claim. (Cl. 99—287)

The present invention relates to a coffee maker and more especially to a device of this nature which can be placed directly upon a coffee cup or like receptacle.

An object of the invention is to provide a coffee maker with which coffee can be made in a relatively short time.

Another object of the invention is to provide a coffee maker with which an efficiently infused beverage is produced.

Still another object of the invention is to provide a coffee maker which will enable the production of a cup of coffee which is received in a cup at a suitably high temperature.

A still further object of the invention is to provide a coffee maker which is convenient and highly efficient in use.

Another object of the invention is to provide a device of the above character which is relatively simple in construction and can be produced at relatively low cost.

Other objects and advantages of the invention will be apparent during the course of the following description.

Referring to the drawing wherein are illustrated a preferred and a modified form of the invention, FIGURE 1 is a view partly in side elevation and partly in vertical section of a preferred form of the invention.

FIGURE 2 is a top plan view of the coffee maker thereof.

FIGURE 3 is an enlarged fragmentary section taken on line 3—3 of FIGURE 1.

FIGURE 4 is a fragmentary vertical section of a modified form of the invention.

In the drawing wherein like characters of reference are employed to designate like parts throughout the views, 10 designates the generally tubular body of the preferred form of the coffee maker or beverage producer mounted upon a drinking cup C of conventional coffee drinking size.

Body 10 embodies an upper cylindrical brewing section 11 open at the top and integral with a conical wall 12 tapering downwardly from the section 11 to join the outer edge of a central conical wall 13 tapering to an elevated aperture 15. This aperture forms an outlet the area of which is a minor fraction of the area of the brewing section at the plane of the filter.

At a relatively short distance above its juncture with the bottom wall section, the circumferential wall of brewer 11 is offset upon a horizontal plane so that its lower portion is of decreased diameter relative to its remaining upper portion. This forms an internal shoulder 16 upon the upper surface of a ledge disposal in a plane perpendicular to the axis of the brewer.

Disposed horizontally about the lower diametrically reduced end part of wall 11 is the vertical flange 17 of an annular supporting element shaped to also provide a horizontal outwardly projecting annular flange 18. The latter is adapted to seat upon the top edge of cup C. Inwardly of the cup the seating flange has, at angularly spaced intervals, a plurality of vent apertures 19.

Upon the internal shoulder 16 is horizontally mounted a filter or like member 20 designed to effectively strain the grounds from the infusion. Member 20 may advantageously comprise a cotton relatively stiff sheet adapted to effectively filter the solid matter from the infused extract and having a diameter exceeding that of the shouldered portion of the body by an annular margin sufficient to provide a suitable clamping overhang.

The filter is removably held in filtering position by a holder designated at 21 which may essentially be cylindrical. At its inner bottom end filter holder 21 is open and provided with an annular rim which may be flared horizontally outward to form a sealing lip 22. At the outer or top end holder 21 can be shaped to form radial inwardly directed flange sections 23 which may be advantageously sector like and curved at their juncture with the cylindrical wall to define a generally square shaped opening extending to the cylindrical wall. The latter is of such diameter as to be easily inserted telescopically within the circumferential body wall 11 to firmly engage the filter and clamp it against the annular shoulder 16. The latter is thus in the form of a ledge disposed inwardly of the body wall relatively near the bottom end thereof. Member 21, in such operative position, is radially spaced from body 11 for convenient assembly and its outer or upper end terminates a relatively short distance below the top of body 11 so as to be conveniently grasped by the user who is able to readily grip the flange sections 23. The bottom end of the holder affords an efficient contact rim firmly pressing upon the periphery of the filter to effectively hold the filter during coffee making.

In the modified form of the invention, shown at FIGURE 4, a cylindrical body 30 is constructed so that its bottom end forms a horizontally directed outward flare 31 upon its exterior contour. It is open at top and bottom ends and assembled upon a base 32.

This base is composed of a tapered neck 33 having formed at its upper enlarged end an annular horizontally disposed L-shaped socket ring 34. The open upper end of vertically disposed neck 33 joins the inner edge of a horizontal flange 35 integral with an upstanding vertical flange 36. These flanges are formed to provide a groove 37 extending upward of the flat annular surface on flange 35 and contoured to generally conform to the exterior shape of flare 31. Above groove 37 at the flange 36 has a rabbeted recess 38.

The lower diametrically reduced end of the neck coaxially joins a circular horizontally disposed plate 39, the center part of which forms a flat bottom for the neck passage while an annular part radially outward of the bottom end of the neck produces an extension adapted to be seated upon a cup. At its center, horizontal wall 39 is provided with an aperture 40 having but a relatively small area as compared to the horizontal area of the upper larger end of neck 33. Outwardly of the neck, wall 39 is advantageously provided with a plurality of vent openings 41. At its peripheral margin the under face of wall 39 has a stop bead 42 to retain it on the cup.

A filter, such as a cotton cloth member 42, is fitted within groove 37 and the flared end of member 30 is pressed thereagainst so as to resiliently clamp the filter 43 within socket 34 with the filter body held in a flat horizontal position.

In making coffee, as in the structure of FIGURE 1, the device 10 is fitted upon the top edge of a conventional coffee cup and a tablespoonful of ground coffee is placed upon the filter 20. A measured quantity of hot water, depending upon the particular size of the coffee cup, is then poured into brewer 11. As a result the ground coffee is steeped in the water and the infusion produces an extract which is filtered through member 20. The extracted and filtered coffee flows through passage 12 and passes downward through the aperture 15. As the latter is of a cross-sectional area much smaller than the inlet through the filter the cup receives a charge of coffee with the lapse of sufficient time to effect highly efficient infusion to produce a desirable cup of coffee. Thus, the operation may be carried out in front of the user and the body is thereafter readily removed with the filter holder and filter detached for convenient cleaning.

The construction is such as to enable stirring of the grounds to accelerate extraction. The device could also be used for straining milk, frying fat, wine and the like.

The speed of delivery through the outlet, many times smaller than the inlet, is such that the cup full of coffee is of a desirably high temperature. This affords sufficient time for steeping of the ground coffee to form a most efficient liquid of fine flavor which extracts the beneficial ingredients. The flow of the heated coffee through the tapered passage 12 reduced from the opening at the bottom of the brewer receptacle just below the flexible filter to an outlet opening below and having an area but a small fraction of the area of said opening at the bottom of the brewer causes the formation of a gas bubble which bears against the underside of the filter medium and elevates the latter with vibrations against the pressure occasioned by the weight of the grounds and water. The result of such arcing of the filter is to spread the filter material and enlarge the interstices thereof to promote the flow of extract containing liquid, without the passage of solid matter, adjacent the wall of the tapered passage.

It is to be understood that the form of the invention herewith shown and described is to be taken as a preferred example of the same, and that various changes in the shape, size and arrangement of parts may be resorted to, without departing from the spirit of the invention or the scope of the subjoined claim.

Having thus described my invention, I claim:

A coffee brewer for use with a coffee cup, comprising: a hollow cylindrical brewing section having adjacent its lower end an annular section of reduced diameter; the juncture of said reduced section with the main cylindrical body forming a shoulder adapted to provide support for a brewer support ring on its outside and a filter holder on the inside of the cylindrical member; said brewer support comprising an annular ring with a radially extended flange at its lower end, said annular support ring engaging the outer surface of the reduced section and at its upper edge engaging the outside of said shoulder; the flange member of said support ring extended outwardly a sufficient distance to be mounted upon the upper edge of a coffee cup and having a plurality of vent holes located between the edge of the cup and the annular support ring; a cylindrical filter support assembly mounted within the brewing cylinder and supported on said shoulder; a filter of cotton material mounted on the filter support and adapted to flex under the force of vapor pressure, said filter extended over the edges of the filter support member and wedged between the filter support member and the interior surface of the cylindrical brewer section and between the lower edge of the filter support and the support shoulder; means below said filter and at the end of said reduced section for generating a vapor pressure below the filter to flex the filter upwardly, said means comprising a downwardly extending frusto-conical section integral with the cylindrical body member and joined to the lower extremity of the reduced diameter section, said frusto-conical section being closed by an upwardly extending conical portion the apex of which has a small opening therethrough for permitting the brewed coffee to leave the brewing cylinder.

References Cited in the file of this patent

UNITED STATES PATENTS

| | | |
|---|---|---|
| 174,983 | Spencer | Mar. 21, 1876 |
| 1,143,239 | Talbutt et al. | June 15, 1915 |
| 1,499,281 | Altieri | June 24, 1924 |
| 1,570,807 | Watson | Jan. 26, 1926 |
| 1,701,194 | Rosenstein et al. | Feb. 5, 1929 |
| 2,069,229 | Ferris | Feb. 2, 1937 |
| 2,107,236 | Cory | Feb. 1, 1938 |
| 2,338,140 | States | Jan. 4, 1944 |
| 2,401,529 | Varney et al. | June 4, 1946 |
| 2,403,691 | States | July 9, 1946 |